US007163626B1

(12) United States Patent
Cuypers et al.

(10) Patent No.: US 7,163,626 B1
(45) Date of Patent: Jan. 16, 2007

(54) DEVICE FOR TREATING A GAS/LIQUID MIXTURE

(75) Inventors: Cindy Thérèse Cornelia Cuypers, Delft (NL); David Ian Stanbridge, Arnhem (NL)

(73) Assignees: Spark Technologies and Innovations N.V., Curacao (AN); Koch-Glitsch N.V., Curacao (AN)

( * ) Notice: Subject to any disclaimer, the term of this patent is extended or adjusted under 35 U.S.C. 154(b) by 473 days.

(21) Appl. No.: 09/831,001

(22) PCT Filed: Nov. 4, 1999

(86) PCT No.: PCT/NL99/00677

§ 371 (c)(1), (2), (4) Date: Sep. 19, 2001

(87) PCT Pub. No.: WO00/25931

PCT Pub. Date: May 11, 2000

(30) Foreign Application Priority Data

Nov. 4, 1998 (NL) .................................. 1010478

(51) Int. Cl.

| | |
|---|---|
| ***B01D 33/27*** | (2006.01) |
| ***B01D 45/16*** | (2006.01) |
| ***B01D 45/12*** | (2006.01) |
| ***B04C 3/04*** | (2006.01) |
| ***B04C 3/06*** | (2006.01) |
| *B04C 3/00* | (2006.01) |

(52) U.S. Cl. .............................. 210/512.3; 210/512.1; 210/512.2; 210/787; 210/788; 210/194; 210/188; 55/318; 55/336; 55/337; 55/338; 55/340; 55/456; 55/457; 96/301; 96/188; 96/216; 96/206; 95/271

(58) Field of Classification Search ............ 210/512.2, 210/512.3, 512.1, 787, 788, 194, 188; 55/318, 55/336, 337, 345–348, 338, 340, 456, 457; 95/271; 96/301, 188, 216, 206
See application file for complete search history.

(56) References Cited

U.S. PATENT DOCUMENTS 4,187,089 A 2/1980 Hodgson .................... 55/219

FOREIGN PATENT DOCUMENTS

| | | |
|---|---|---|
| EP | 0162441 | 11/1985 |
| EP | 0210910 | 2/1987 |
| EP | 0267285 | 5/1988 |
| EP | 0281630 | 9/1988 |
| FR | 2630027 | 10/1989 |
| FR | 2681259 | 3/1993 |
| WO | WO9305339 | 3/1993 |
| WO | WO9749477 | 12/1997 |

*Primary Examiner*—Krishnan S. Menon
(74) *Attorney, Agent, or Firm*—The Web Law Firm

(57) ABSTRACT

The present invention relates to a device for treating a gas/liquid mixture, comprising: an inlet opening for the mixture; an outlet for the mixture located downstream; rotating means arranged in the tube for setting the mixture into rotating movement; one or more outlet openings arranged downstream relative to the rotating means for allowing a part of the mixture to flow laterally out of the tube; a return conduit arranged in axial direction through the rotating means for reintroducing into the tube the flow which has exited via the outlet openings; and divergence means arranged close to the outlet opening of the return conduit for allowing the reintroduced flow to diverge laterally.

20 Claims, 3 Drawing Sheets

DEVICE FOR TREATING A GAS/LIQUID MIXTURE

BACKGROUND OF THE INVENTION

So-called cyclones are used on a large scale to separate gas/liquid mixtures, for instance to dry natural gas. On extraction the natural gas can be mixed with salt water, which can cause much corrosion in the pipelines through which the gas must flow.

In a so-called axial cyclone the entering mixture is set into a rotating movement, whereby a heavy fraction (in the order of magnitude of 2–25% of the total flow) in which a relatively large amount of liquid is present, is flung against the outer wall of the cyclone. This fraction can be discharged by arranging openings in the outer wall. It is also already known to reintroduce a part of the discharged fraction into the liquid flow in order to further separate this fraction as well into liquid and gas phase.

In the known cyclones the outlet opening for the returned flow is usually arranged in the centre of the cyclone. As the mixture has a substantially axial speed component in the centre of the cyclone, creep may occur along the outlet opening whereby liquid droplets from the inlet flow enter the outlet flow. When capacity is increased, i.e. when the pressure and/or the quantity of the mixture is increased, such creep will become worse.

In view of the above, the capacity of such a cyclone forms a limitation, whereby installations for the desired gas/liquid separation would have to increase in size, which is undesirable.

SUMMARY OF THE INVENTION

The present invention provides a device for treating a gas/liquid mixture, comprising:

an inlet opening for the mixture and an outlet for the mixture located downstream;

rotating means arranged in the tube for setting the mixture into rotating movement;

one or more outlet openings arranged downstream relative to the rotating means for allowing a part of the mixture to flow laterally out of the tube;

a return conduit arranged in axial direction through the rotating means for reintroducing into the tube the flow which has exited via the outlet openings; and divergence means arranged close to the outlet opening of the return conduit for allowing the reintroduced flow to diverge laterally.

The rotating means preferably comprise a so-called swirl element with an outflow angle, for the mixture of more than 30°, for instance roughly 45°, 60° or 70°, whereby the tangential speed component of the mixture, and therefore the swirl number, and the separation efficiency are increased.

The present invention further provides an installation, wherein one or more devices according to the present invention are applied.

The present invention further provides a device for treating a gas/liquid mixture, comprising:

an inlet opening for the mixture;

rotating means arranged in the tube for setting the mixture into rotating movement; and a substantially conically tapering outlet for the mixture located downstream, wherein one or more slots are arranged to allow a part of the mixture to flow laterally out of the outlet.

Due to the conically tapering outlet pipe the pressure on the wall remains substantially at a constant value, whereby the separation of liquid via the slots proceeds better since pressure drop, whereby liquid could re-enter the outlet pipe, is avoided.

An additional tube is preferably arranged upstream in the outlet pipe, so that the slots can be as long as the outlet pipe permits.

BRIEF DESCRIPTION OF THE DRAWINGS

Further advantages, features and details of the present invention will be elucidated on the basis of the following description with reference to the annexed drawings, in which.

DETAILED DESCRIPTION OF THE EMBODIMENTS

Figure 1:
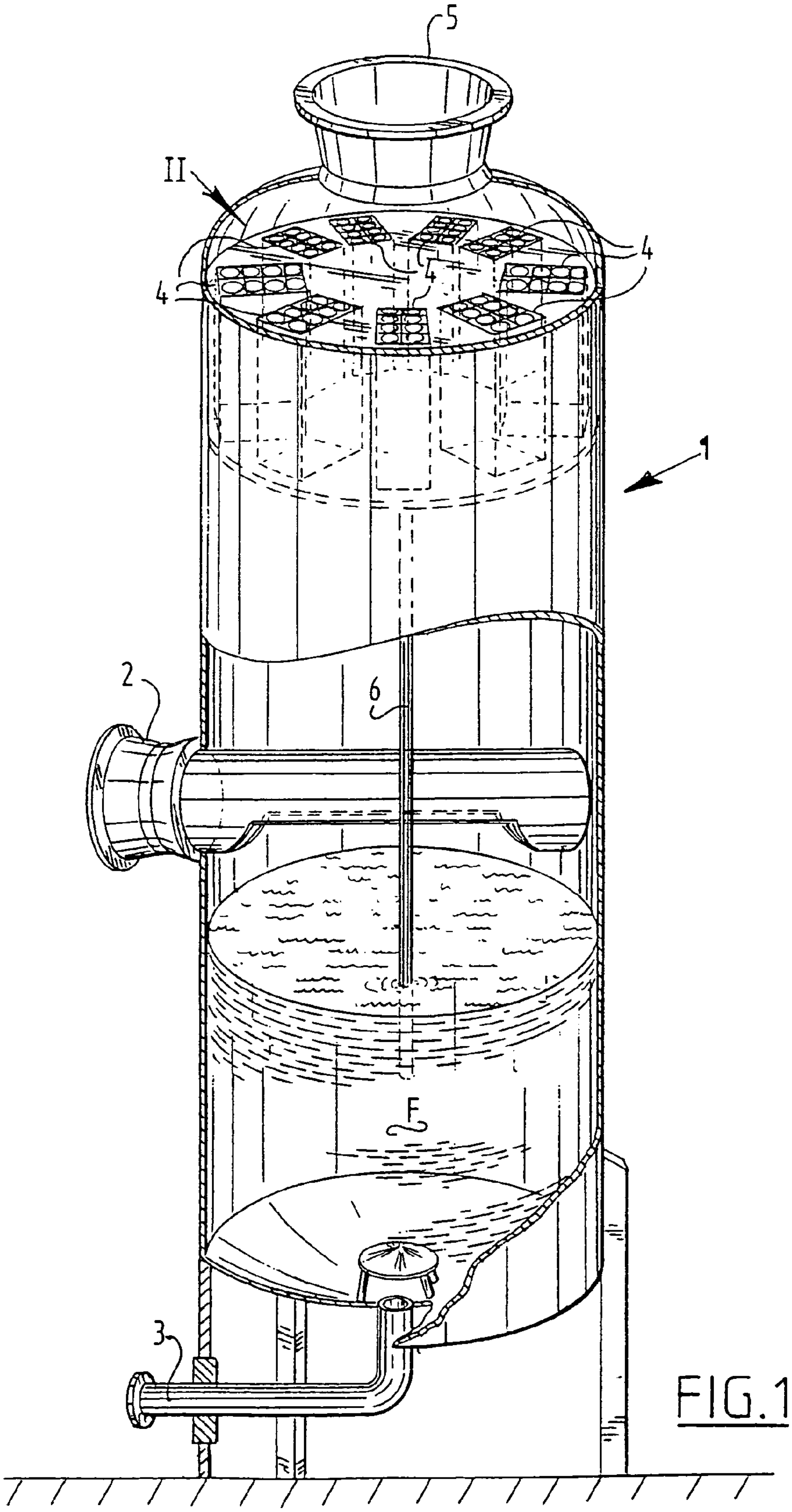
Figure 2:
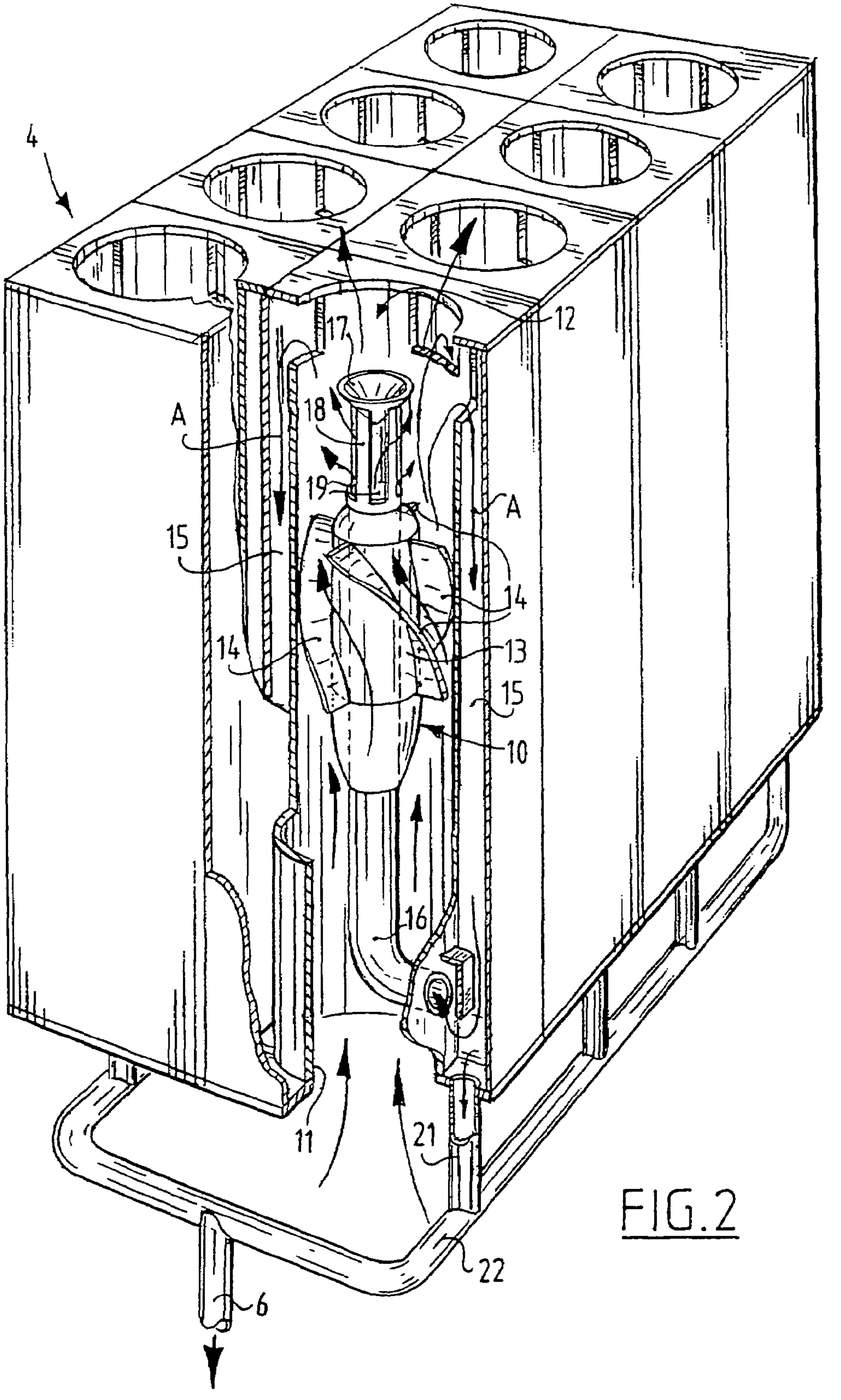
Figure 3:
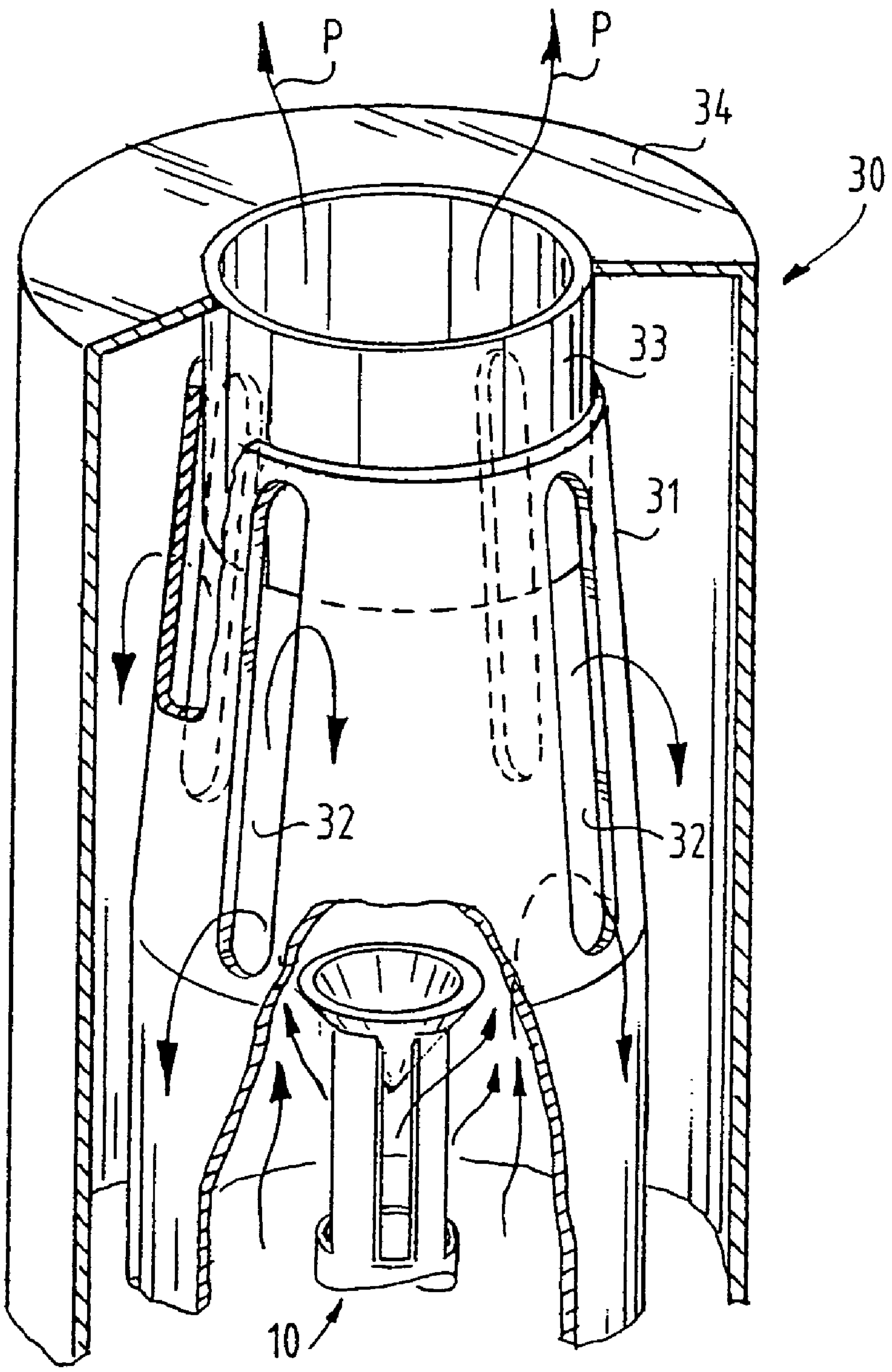

FIG. 1 shows a partly schematic view of an installation for separating a gas/liquid mixture, wherein a device according to the present invention is applied;

FIG. 2 shows a partly cut-away view in perspective of detail II of FIG. 1; and FIG. 3 shows a partly cut-away view in perspective of a further preferred embodiment of a device according to the present invention.

A vessel 1 (FIG. 1) is provided with a connecting stub 2 for intake of gas/liquid mixtures, such as natural gas mixed with (salt sea) water. At the bottom of vessel 1 is collected the liquid F which can be drained via a pipe 3. In addition to a number of separating means (not shown) a number of boxes 4 are arranged in the upper part of vessel 1, while thereabove a connecting stub 5 is arranged on the vessel for discharging gas which has been dried at least partially or to a considerable degree. Boxes 4 are each provided individually or collectively with a conduit 6 which is in communication with the liquid F in the bottom of the vessel for draining liquid from each of the boxes.

Although in the present embodiment the boxes 4 are shown in a vertical arrangement, they can also be in a lying arrangement in another preferred embodiment which is not further shown.

In an embodiment of a box 4, FIG. 2, are situated eight cyclones 10, one of which is shown in FIG. 2, which each comprise a cylindrical wall 11 which forms on the underside an inlet for the gas/liquid mixture, and an outlet opening 12 on the upper side thereof. Roughly centrally in the space enclosed by the cylindrical wall is placed a so-called swirl element 13 which is provided with blades 14 for setting the mixture into rotating movement. A part of the mixture is flung outward by this rotating movement, as indicated with arrows A, and transported via an interspace 15 to a recycle conduit 16. Recycle conduit 16 extends through swirl element 13 and is closed at the top with a substantially conical cap 17. Under conical element 17 slots 19 are recessed into an end part 18 of conduit 16 to allow the mixture recycled via conduits 16 (about 15% of the quantity of the original mixture) to exit in divergent manner. Further connected to space 15 is a conduit 21 for draining liquid, which conduit debouches onto a ring line 22 into which drain conduits of other cyclones debouch on one side and the downcomer 6 to the space in the bottom of the vessel for collecting liquid F is connected on the other.

Measurements have been taken on the above described cyclone under atmospheric pressure with a PITOT tube adapted for this purpose. The radial pressure profile in the tube is measured herewith as well as the so-called swirl number. The swirl number, i.e. the ratio of the tangential angular momentum flux relative to the axial angular momentum flux of the flow in the cyclone largely determines the separation characteristic or the efficiency of the cyclone. The value of the pressure prevailing around the cyclone generally lies between the pressure on the wall and the pressure at the location where the recycle conduit debouches into the cyclone. A steep pressure profile between the centre and the wall of the cyclone tube ensures that the recycle flow is sufficiently powerful, and furthermore that the static pressure around the cyclone is as high as possible.

It has been found from numerical flow simulations and the above mentioned experimental research that the above stated objectives are achieved not only by using the above described diverging flow but also by making the outflow angle of the mixture along the swirl element relatively large, for instance about 45°, 60° or 70°, preferably in any case greater than 30°, whereby the tangential speed component (and therefore the swirl number and the separation efficiency) is increased. In order to sustain a laminar flow along such a swirl element with large outflow angle, this latter is designed using numerical flow simulation methods.

Due to the realized lateral outflow of the recycle flow, liquid creep to the middle of the swirl element is (all but) wholly prevented, as straight moving flow is no longer present in the centre of the flow. The droplets coming from the recycle flow are entrained in the swirl flow and separated via the slots. It also becomes possible hereby to increase the maximum capacity of the cyclone. From the measurements under atmospheric conditions the conclusion seems justified that capacity can also be increased at higher pressure and with a factor in the order of magnitude of two.

At higher capacity small droplets are separated better by the associated higher tangential speeds. This is expressed as $D_{50}$, i.e. the average diameter of 50% of the droplets, and amounts to 4 μm in the above described preferred embodiment of the present invention.

In the device according to the present invention practically the whole gas/liquid flow has a tangential speed component, whereby the swirl number is higher as well as the separation efficiency.

Because the average pressure in the chamber outside the cyclone becomes higher, liquid in the downcomer is prevented from being able to move upward. This so-called Static Head decreases with for instance 3–12 mbar (under atmospheric conditions), whereby the cyclone according to the present invention is also more useful than existing cyclones in a horizontal arrangement.

Arranged above a swirl element 10 in a device 30 (FIG. 3) is a conically tapering outlet pipe 31 which is provided with outflow slots 32. Due to the conicity of for instance 1°–30° the pressure at the edge of the wall remains at a constant value and pressure drop in the outlet pipe is avoided. On the top part of conical pipe 31 is arranged a concentric pipe 33 which protrudes upstream to some extent into pipe 31 and is fixed on the other side to an upper wall 34. This additional pipe part 33 forms a barrier for the liquid at the end of the outlet pipe and therefore minimizes the quantity of liquid in the outlet flow, as indicated schematically with arrows P.

Outflow slots 32 can further extend over practically the whole length of conical pipe 31, beyond the bottom edge of concentric pipe part 33.

The present invention is not limited to the above described preferred embodiment; the rights sought are defined by the following claims, within the scope of which many modifications can be envisaged.

The invention claimed is:

1. A device for treating a gas/liquid mixture, comprising:

a) a substantially vertical tube having an inlet opening for the mixture and an outlet for the mixture located downstream;

b) rotating means arranged in the tube for setting the mixture into rotating movement;

c) one or more outlet openings arranged downstream relative to the rotating means for allowing a separated part of the mixture to flow laterally out of the tube;

d) a return conduit arranged centrally in an axial direction through the rotating means for reintroducing the flow which has exited via the outlet openings, and including a divergence element at an end part of the return conduit for causing the reintroduced flow to diverge substantially laterally outward from the return conduit and substantially prevent liquid creep flow along the rotating means; and e) an axial obstruction in the reintroduced flow path for inducing the reintroduced flow in the divergence element to diverge substantially laterally outward from the divergence element;

wherein a flow path of the mixture comprises moving up the tube, out the one or more outlet openings, and reintroducing the flow through the return conduit with the flow diverging substantially laterally outward from the return conduit.

2. The device as claimed in claim 1, wherein the divergence element comprises slots defined in the return conduit.

3. The device as claimed in claim 1, wherein the axial obstruction comprises a substantially conical disposed in the reintroduced flow path.

4. The device as claimed in claim 1, wherein the outlet openings are formed by a number of slots in the side wall of the tube.

5. The device as claimed in claim 1, wherein the rotating means comprise a swirl element, of which the outflow angle for the mixture amounts to 15°–85°.

6. The device as claimed in claim 5, wherein the outflow angle amounts to about 45°, about 60° or about 70°.

7. The device as claimed in claim 1, wherein 50% of droplets in the separated part of the mixture have a diameter of 4 μm or less.

8. An installation for separating water from gas, comprising:

a) a vessel provided with a connecting stub for supply of the mixture;

b) a drain conduit for draining liquid collected in the bottom of the vessel; and c) one or more boxes in which one or more devices for treating a gas/liquid mixture, wherein the device comprises:

a substantially vertical tube having an inlet opening for the mixture and an outlet for the mixture located downstream;

rotating means arranged in the tube for setting the mixture into rotating movement;

one or more outlet openings arranged downstream relative to the rotating means for allowing a part of the mixture to flow laterally out of the tube;

d) a return conduit arranged centrally in axial direction through the rotating means for reintroducing the flow which has exited via the outlet openings, and including a divergence element at an end part of the return conduit for causing the reintroduced flow to diverge substantially laterally outward from the return conduit and substantially prevent liquid creep flow along the rotating means; and e) an axial obstruction in the reintroduced flow path for inducing the reintroduced flow in the divergence element to diverge substantially laterally outward from the divergence element;

wherein a flow path of the mixture comprises moving up the tube, over the one or more outlet openings, and reintroducing the flow through the return conduit with the flow diverging substantially laterally outward from the return conduit.

9. The installation as claimed in claim 8, wherein at least one liquid conduit extends between the box and the space in the bottom of the vessel where the liquid is collected.

10. A device for treating a gas/liquid mixture according to claim 1, comprising:

a) a substantially vertical tube having an inlet opening for the mixture;

b) rotating means arranged in the tube for setting the mixture into rotating movement;

c) a substantially conically tapering outlet for the mixture located downstream, wherein one or more slots are arranged to allow a part of the mixture to flow laterally out of the outlet;

d) a return conduit arranged centrally in an axial direction through the rotating means for reintroducing the flow which has exited via the one or more slots, and including a divergence element at an end part of the return conduit for causing the reintroduced flow to diverge substantially laterally outward from the return conduit and substantially prevent liquid creep flow along the rotating means; and e) an axial obstruction in the reintroduced flow path for inducing the reintroduced flow in the divergence element to diverge substantially laterally outward from the divergence element.

11. The device as claimed in claim 10, wherein the conicity of the tapering outlet amounts to 1°–30°.

12. The device as claimed in claim 10, further including an additional tube part which protrudes at least partially upstream in the outlet.

13. A device for treating a gas/liquid mixture, comprising:

a) a substantially vertical tube having an inlet opening for the mixture and an outlet for the mixture located downstream;

b) a swirl element arranged in the tube for setting the mixture into rotating movement;

c) one or more outlet openings arranged downstream relative to the swirl element for allowing a separated part of the mixture to flow laterally out of the tube;

d) a return conduit arranged centrally in an axial direction through the rotating means for reintroducing the flow which has exited via the outlet openings, and including a divergence element at an end part of the return conduit causing reintroduced flow to diverge substantially laterally outward from the return conduit and substantially prevent liquid creep flow along the swirl element; and e) an axial obstruction in the reintroduced flow path for inducing the reintroduced flow in the divergence element to diverge substantially laterally outward from the divergence element.

14. The device as claimed in claim 13, wherein the divergence element comprises slots defined in the return conduit.

15. The device as claimed in claim 13, wherein the axial obstruction comprises a substantially conical element disposed in the reintroduced flow path.

16. The device as claimed in claim 13, wherein the outlet openings are formed by a number of slots in the side wall of the tube.

17. The device as claimed in claim 13, wherein the outflow angle of the swirl element for the mixture amounts to 15°–85°.

18. The device as claimed in claim 17, wherein the outflow angle amounts to about 45°, about 60° or about 70°.

19. The device as claimed in claim 3, wherein the conical element is disposed at the end of the return conduit.

20. The device as claimed in claim 15, wherein the conical element is disposed at the end of the return conduit.

* * * * *

UNITED STATES PATENT AND TRADEMARK OFFICE

CERTIFICATE OF CORRECTION

PATENT NO. : 7,163,626 B1
APPLICATION NO. : 09/831001
DATED : January 16, 2007
INVENTOR(S) : Cuypers et al.

It is certified that error appears in the above-identified patent and that said Letters Patent is hereby corrected as shown below:

Column 2, Lines 16-17, delete the heading "DETAILED DESCRIPTION OF THE PREFERRED EMBODIMENTS"

Column 2, before Line 28, before the paragraph beginning "A vessel 1", insert the heading -- DETAILED DESCRIPTION OF THE PREFERRED EMBODIMENTS --

Column 4, Line 33, Claim 3, "conical disposed" should read -- conical element disposed --

Signed and Sealed this

Twenty-ninth Day of May, 2007

JON W. DUDAS
*Director of the United States Patent and Trademark Office*